United States Patent [19]
Kielwein et al.

[11] Patent Number: 5,251,843
[45] Date of Patent: Oct. 12, 1993

[54] NOISE-DAMPED SENSOR FOR A SAFETY BELT RETRACTOR

[75] Inventors: Thomas Kielwein, Eschach; Johannes Schmid, Schwäbisch Gmünd-Hussenhofen, both of Fed. Rep. of Germany

[73] Assignee: TRW Repa GmbH, Alfdorf, Fed. Rep. of Germany

[21] Appl. No.: 931,838

[22] Filed: Aug. 18, 1992

[30] Foreign Application Priority Data

Aug. 20, 1991 [DE] Fed. Rep. of Germany ... 9110281[U]

[51] Int. Cl.[5] .............................................. B60R 22/40
[52] U.S. Cl. .................................. 242/107.4 A
[58] Field of Search ................. 242/107.4 A, 107.4 B; 280/806; 297/478, 480

[56] References Cited

U.S. PATENT DOCUMENTS

| | | | |
|---|---|---|---|
| 4,319,721 | 3/1982 | Kawai et al. | 242/107.4 A |
| 4,619,417 | 10/1986 | Teraoka et al. | 242/107.4 A |
| 4,934,626 | 6/1990 | Kimura | 242/107.4 A |

*Primary Examiner*—John M. Jillions
*Attorney, Agent, or Firm*—Tarolli, Sundheim & Covell

[57] ABSTRACT

A sensor for use in a safety belt retractor equipped with a reel blocking mechanism performs a vehicle-sensitive triggering of said blocking mechanism. A sensor housing (30) has a trough in which a sensor ball (34) is received and a sensor lever which is pivotally mounted on said sensor housing (30). The lever has a cap which bears on said ball. The cap and the trough each have at least one portion connected via at least one elongated web (40) to said sensor housing (30). Thus, these cap and trough portions are elastically deflectable under the action of vibrations transmitted to the ball (34) in use of the sensor to dampen noise generated by the sensor parts.

13 Claims, 5 Drawing Sheets

NOISE-DAMPED SENSOR FOR A SAFETY BELT RETRACTOR

The invention relates to a sensor for the vehicle-sensitive triggering of the blocking mechanism of a safety belt retractor in a vehicle, comprising a sensor housing having a trough in which a sensor ball is received and a sensor lever which is pivotally mounted on the sensor housing and has a cap which bears on the ball.

The purpose of such a sensor is to initiate the locking of the safety belt retractor at a predetermined acceleration or deceleration and a change in attitude of the vehicle.

If a predetermined response threshold depending on the geometry, mass and mutual friction of the sensor parts is exceeded, the ball in the trough of the sensor housing moves out of a rest position. In doing so, it presses the sensor lever and a control pawl connected thereto against an externally toothed control disc which is connected to the belt spool for limited rotation. The control disc is blocked by the engagement of the control pawl and in known manner initiates blocking of the webbing withdrawal.

The ball is also deflected by vibrations when the vehicle is travelling and thereby strikes against other sensor parts, causing noises. The noises thus caused may be found annoying, particularly in the case of belt retractors at the rear seat of a vehicle and belt retractors arranged beneath a hat rack, said retractors then being in the vicinity of the vehicle occupants' ears.

The present invention provides a sensor with which audible noises are reduced and which at the same time is more economical to make.

This is achieved in a sensor of the type defined above by at least one of the cap and trough having a portion bearing on the ball and connected via at least one elongated web to the sensor housing so that the portion of the cap and/or trough is elastically deflectable under the action of the vibrations transmitted to the ball when the vehicle is travelling.

The invention utilizes the knowledge that striking of the ball on the trough and on the cap of the sensor lever and the bearing clearance of the sensor lever, which is mounted for easy movement for reliable response of the sensor, can be responsible for the noise development. Furthermore, the sensor lever or the sensor housing or the entire sensor system may be stimulated to execute natural oscillations. Oscillations which occur are effectively dampened by the elastic connection because deformation work is performed at the webs, or they are shifted into a region of the acoustic spectrum in which they are no longer heard. Depending on the practical implementation of the sensor and the location of its use in the vehicle, even only a fraction of the aforementioned features may be adequate to effectively prevent noise, that is the resilient connection via one or more webs between the sensor lever and the sensor housing, between a support surface for the ball in the trough and the sensor housing and/or between a support surface of the cap on the ball and the sensor lever.

The formation of the damping elements as elongated webs permits economical production. In the production by means of plastic injection moulding further cost advantages are achieved if the webs are formed integrally with the other sensor parts.

Advantageous embodiments of the invention are set forth in the subsidiary claims.

Further features and advantages of the invention will be apparent from the following description of several embodiments and from the drawings, to which reference is made.

Figure 6:
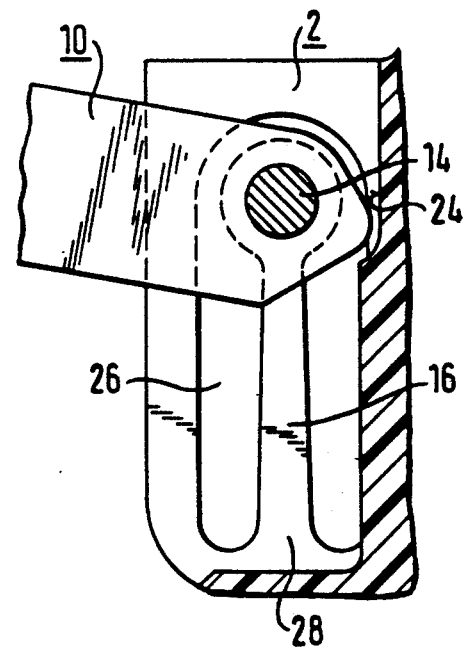
Figure 7:
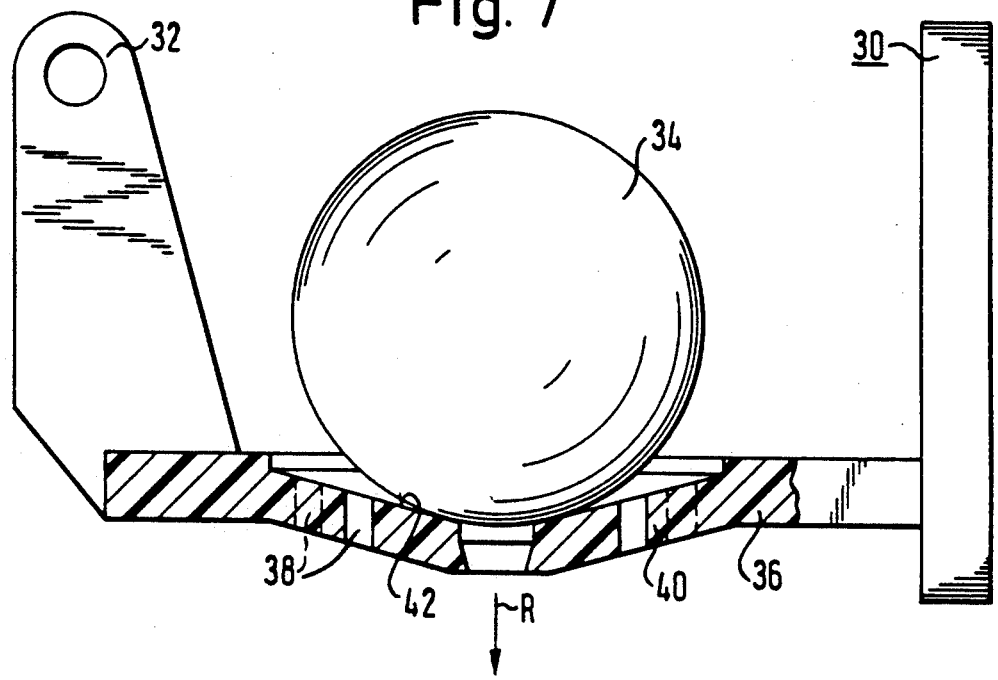
Figure 8:
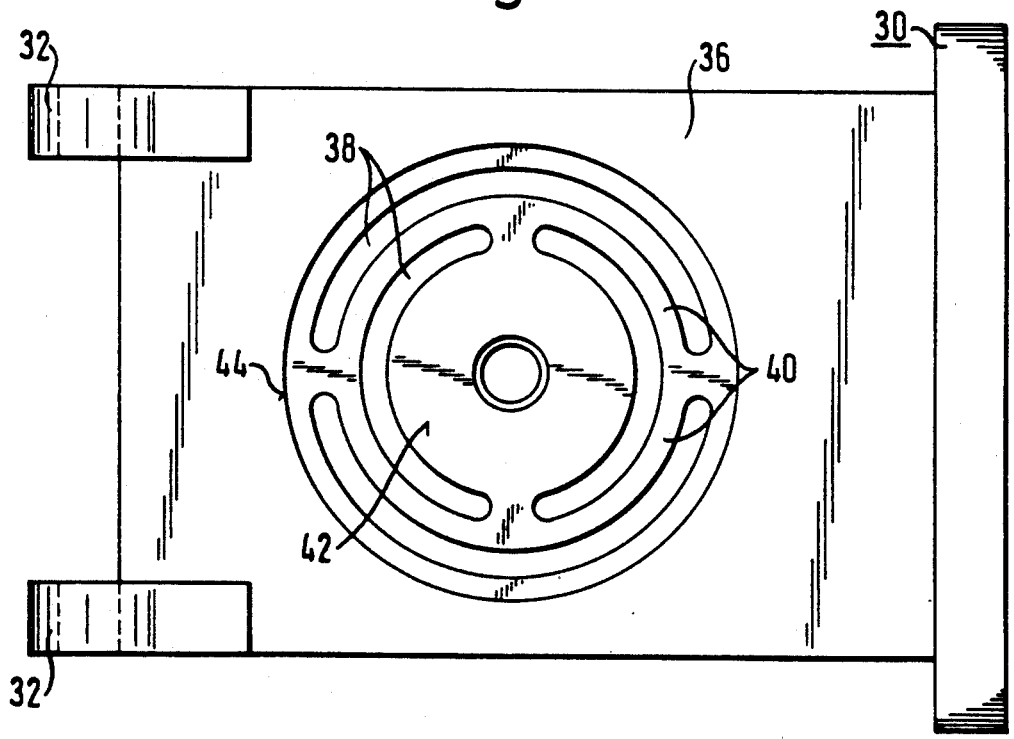
Figure 9:
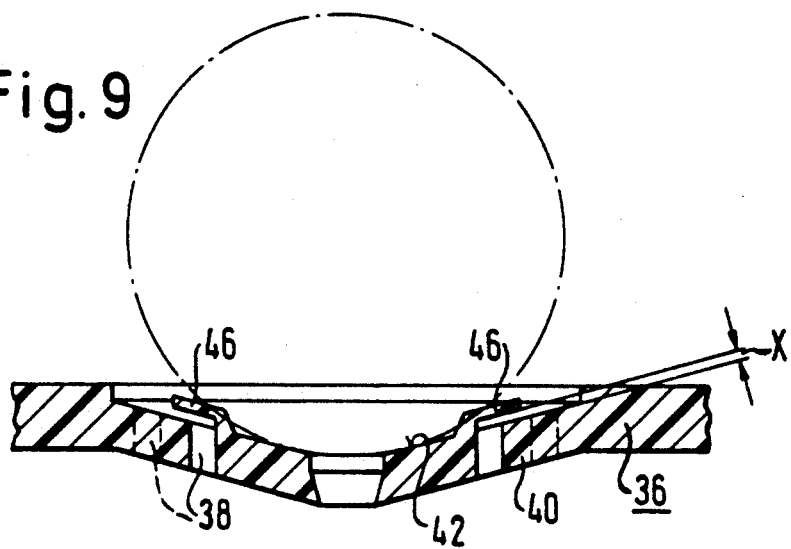
Figure 10:
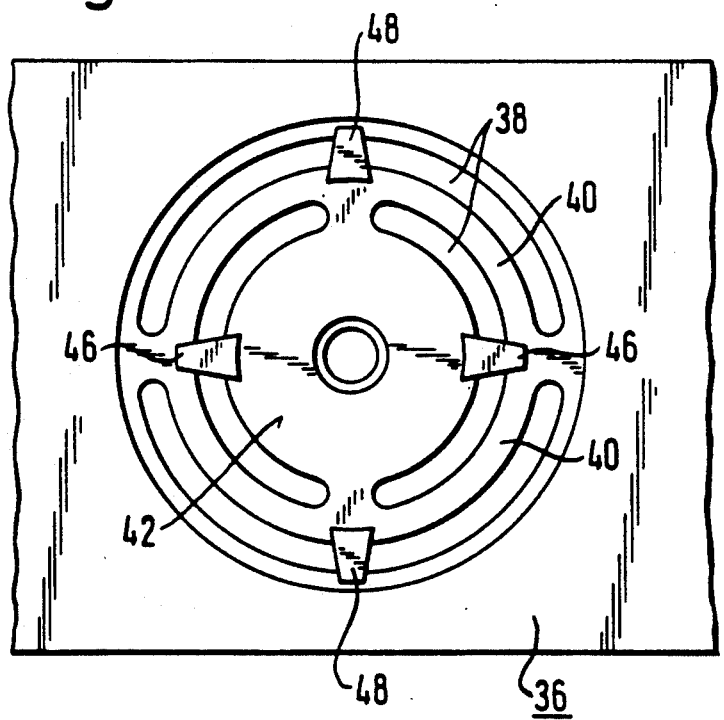
Figure 11:
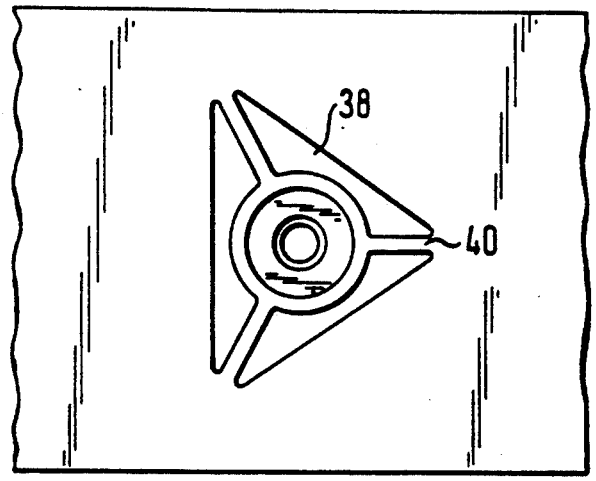
Figure 12:
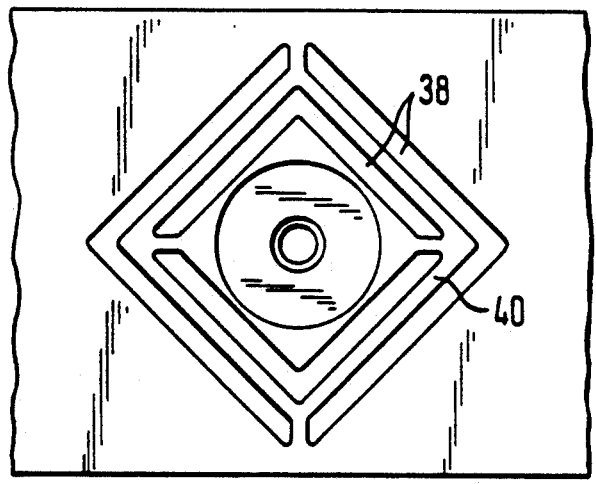
Figure 13:
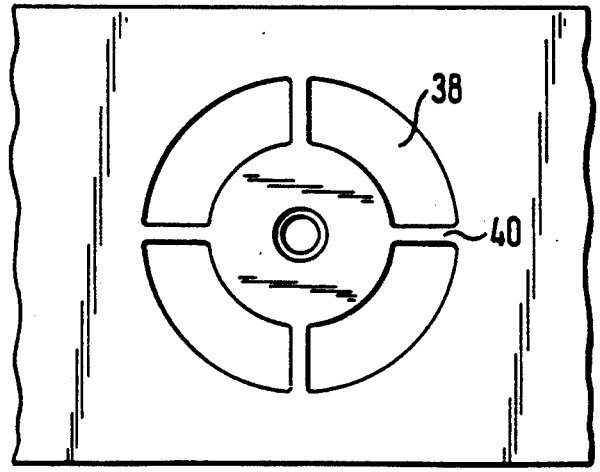

FIG. 6 serves to explain a limitation of the travel of the elastic deflection of the sensor lever by stop means;

FIG. 7 shows partially in section part of an embodiment of a sensor according to the invention for explaining the connection of a support surface for the ball in the trough to the sensor housing;

FIG. 8 is a plan view of the sensor housing illustrated in FIG. 7 seen from above with the ball omitted;

FIGS. 9 and 10 show the trough of the sensor housing in section and in plan view in a particular embodiment; and FIGS. 11 to 13 show by way of example special embodiments for the connection of a support surface via webs formed by cutouts.

Figure 1:
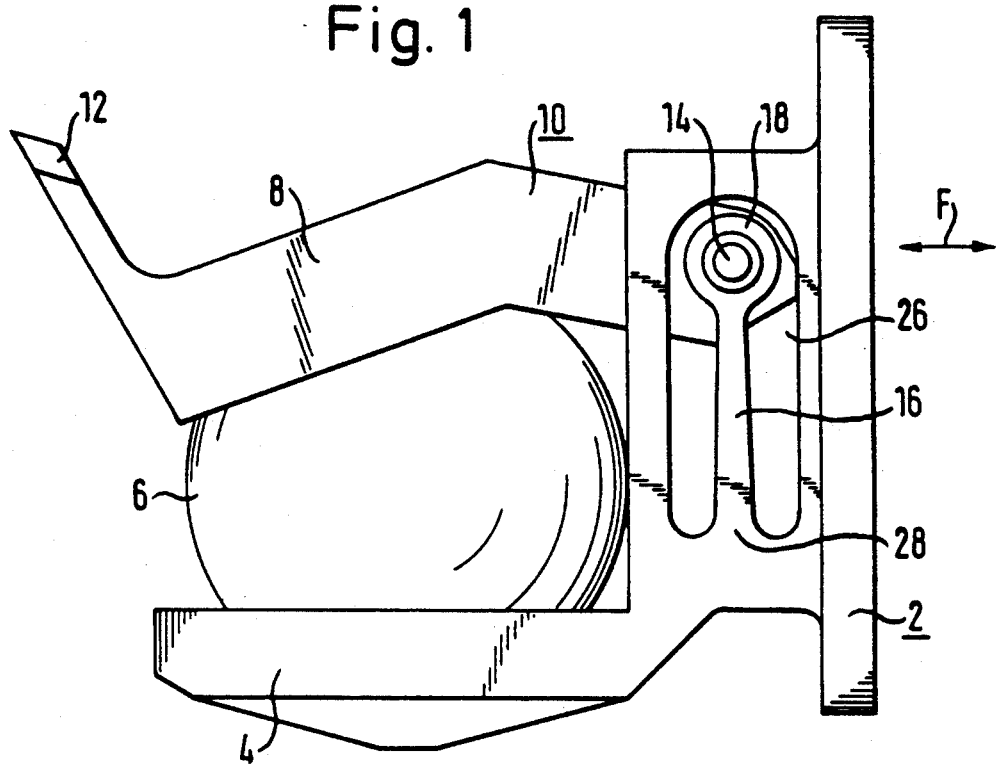
FIG. 1 is a side view of a sensor and shows an elastic connection of the sensor lever to the sensor housing.

In FIG. 1 part of a sensor housing 2 is formed as trough 4 in which a ball 6 is accommodated. A cap 8 which is part of a sensor lever 10 rests on the ball. The sensor lever 10 comprises at one end a control pawl 12 which is disposed opposite an externally toothed control disc, not shown. The sensor 10 is further mounted via a bearing pin 14 on the sensor housing 2.

Two elongated webs 16, of which only one is shown in FIG. 1, are each joined integrally with their one end to the housing 2. At their other end the webs 16 are widened to an eye 18 through which the bearing pin 14 extends. The bearing pin 14 and the eyes 18 are so dimensioned that an easy moving mounting of the sensor lever 10 is ensured. Instead of a separate bearing pin 14 passing through the sensor lever 10 correspondingly formed projections on the sensor lever 10 can engage into the eyes 18. The diameter and alignment of the webs 16 are chosen so that an elastic deflection of the sensor lever 12 takes place substantially in the direction of a vehicle longitudinal axis F.

It has been found that with such a suspension of the sensor lever noises caused by vibrations when travelling are considerably reduced, in particular those noises which are caused on loading of the sensor lever 10 by the ball 6 or on loading of the sensor lever 10 by engagement of the control pawl 12 into the toothed disc. It is also practically impossible for vibrations to be transmitted by resonance because the elongated webs 16 give a very high yieldability of the connection compared with the natural elasticity of the sensor material and consequently no natural frequencies can be transmitted from the region of the sensor lever 10 to the sensor housing 2. A substantial proportion of the noise damping is also due to the deformation work which has to be performed on the webs 16.

Figure 2:
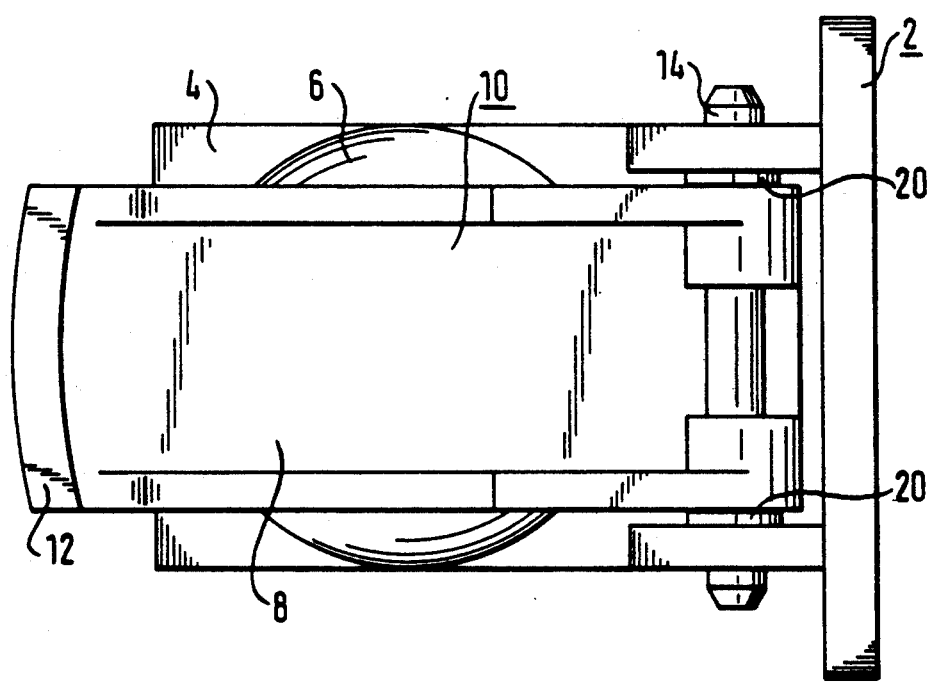
FIG. 2 is a plan view of the sensor lever of FIG. 1.

In the plan view according to FIG. 2 disc-like damping elements 20 can be seen which are made integrally with the eyes 18, not visible here, and resiliently support the sensor lever 10 in the axial direction of the bearing pin 14 as well.

Figure 3:
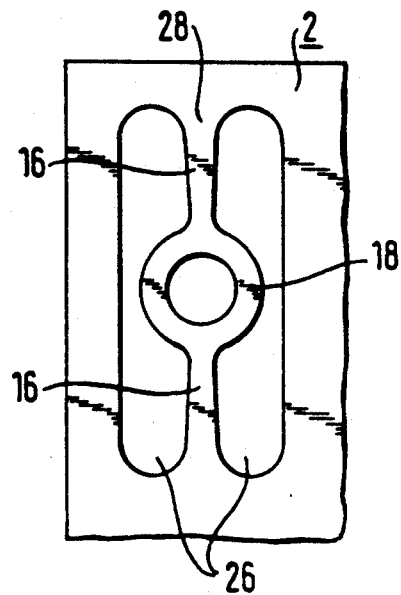
FIGS. 3 and 4 show other embodiments of the connection of the sensor to the sensor housing in the sensor according to FIG. 1.
Figure 4:
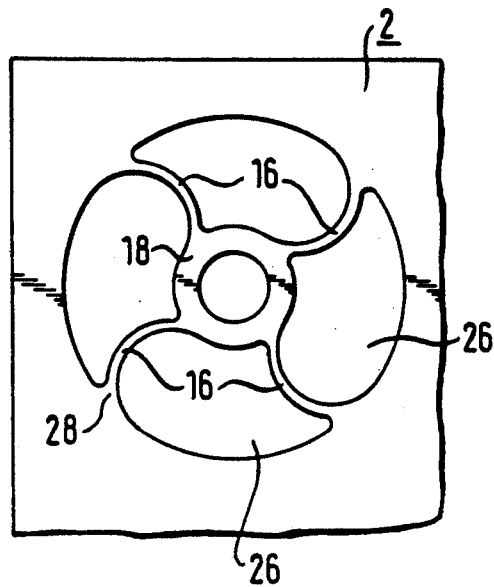

An elastic joining of the eye 18 to the housing 2 via two or four webs 16 is illustrated in FIGS. 3 and 4. In the embodiment according to FIG. 4 the connection is substantially equally elastic in all directions in the plane of the drawing.

Figure 5:
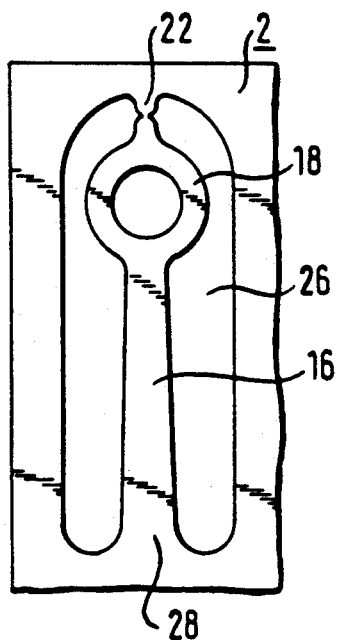
FIG. 5 shows an additional joining of the sensor lever via a desired breakage connection to the sensor housing in the sensor according to FIG. 1.

In FIG. 5 a web 16 is additionally connected to the sensor housing 2 via a desired breakage connection 22. The desired breakage connection 22 consists of a relatively short and partially constricted web and serves for stabilization in the production and assembly of the sensor. The desired breakage connection 22 is severed when the sensor is loaded for the first time and the web 16 thus becomes resiliently deflectable.

In FIG. 6 the sensor lever 10 is configured so that after a certain deflection of the webs 16 it meets a stop surface 24 on the sensor housing 2 in order to prevent excessive loading of the webs 16. This effectively prevents any material fatigue.

Common to all the embodiments described above is that the webs 16 are defined by the cutouts 26 in a wall portion of the sensor housing 2 partially surrounding them and are joined via connection points 28 integrally to the sensor housing 2. This permits economic production, in particular when the sensor is made by injection moulding. Parts corresponding to those of FIG. 1 are denoted by the same reference numerals.

A sensor housing 30 in FIG. 7 is made differently to the sensor housing 2 of FIG. 1. In particular, a rigid eye 32 is provided for mounting a sensor lever, not shown. However, an embodiment is also provided in which the eye 32 is joined elastically to the sensor housing 30 in one of the manners described above. A ball 34 lies in a trough 36 of the sensor housing 30 which is shown in section and in which four semicircular cutouts 38 are formed as best seen in FIG. 8. Between the cutouts 38 webs 40 remain by which a support surface 42 for the ball 34 is joined to the sensor housing 30. Expediently, the cutouts 38 and the webs 40 are made rotational symmetrical to the centre point of the support surface 42. The support surface 42 is elastically deflectable in a direction R under the action of the vibrations transmitted to the ball 34 when travelling. In addition, the plane of the support surface 42 can tilt and the suspension of the support surface 42 thus resembles a cardan suspension. When the ball 34 strikes the support surface 42 the kinetic energy of the ball 34 is converted to a major part to deformation work of the four webs 40 so that only a very small proportion of the corresponding vibrations is transmitted to the sensor housing 30. Resonant transmission of vibrations is prevented as in the embodiment described at the beginning. Any remaining vibrations are no longer in a range of the acoustic spectrum in which they are found annoying. The noise reduction is thus extremely effective. Moreover, the sensor thus equipped, like the embodiment already described, can be made in extremely economical way by injection molding. The sensor housing 30 can be made in one part together with the webs 40 and the support surface 42. The support surface 42 and the webs 40 may however also form an individual part with an outer border 44 which is separately made and is clipped into the sensor housing 30.

In order to dampen the striking of the cap 8 of the sensor lever 10 on the ball 6 in FIG. 1 as well, the cap 8 of the sensor lever 10 should be formed similar to the trough 36 of the sensor housing 30 in FIGS. 7 and 8.

In FIG. 9 two integrally formed noses 46 project outwardly from the support surface 42 and extend over part of the web 40 with a clearance X so that they form a stop for limiting the spring travel. In this case fatigue of the material of the webs 40 is not possible. In the plan view in FIG. 10 two further noses 48 can be seen which each engage from the webs 40 over an outer recess 38 and provide a limitation of the spring travel at this point as well.

Further expedient embodiments of the great number of possibilities for the geometry of the cutouts 38 and the webs 40 are shown in FIGS. 11 to 13. Common to all these embodiments is that they are rotationally symmetrical. If however for specific uses different elasticity of the mounting of the support surface 42 is desired in different directions, the cutouts 38 and the webs 40 may also be arranged asymmetrically.

Depending on the specific configuration of the sensor and the particular intended use, even one of the steps outlined may provide adequate noise damping, i.e. the elastic joining of the sensor lever 10 to the sensor housing 2 or the elastic joining of a support surface, not visible in the Figures, of the sensor lever 10 for the ball 6 to the sensor lever 10 or the elastic joining of the support surface 42 for the ball 34 in the trough 36 to the sensor housing 2.

We claim:

1. A sensor for use in a safety belt retractor equipped with a reel blocking mechanism, said sensor performing a vehicle-sensitive triggering of said blocking mechanism and comprising a sensor housing having a trough in which a sensor ball is received and a sensor lever which is pivotally mounted on said sensor housing and has a cap which bears on said ball, at least one of said cap and said trough having at least one portion connected via at least one elongated web to said sensor housing and elastically deflectable under the action of vibrations transmitted to the ball in use of said sensor.

2. The sensor according to claim 1, wherein said at least one web has a first end connected integrally with said sensor housing and a second end forming a bearing for said sensor lever.

3. The sensor according to claim 2, wherein said at least one web is defined in a wall portion of said sensor housing by a cutout partially surrounding said web.

4. The sensor according to claim 1, wherein a pair of spaced parallel webs each have a first end joined to said sensor housing, said sensor lever being pivotally mounted between the second ends of said webs, and said webs being elastically deflectable about their joint to said sensor housing.

5. The sensor according to claim 4, wherein damping elements are inserted between said sensor lever and said second web ends.

6. The sensor according to claim 1, wherein said at least one web is temporarily coupled to said sensor housing via a desired breakage connection zone adapted to obstruct deflection of said web.

7. The sensor according to claim 1, wherein a plurality of webs acting functionally in parallel are arranged between a support surface for said ball in the trough and said sensor housing.

8. The sensor according to claim 7, wherein said webs are arranged symmetrically on the periphery of said support surface.

9. The sensor according to claim 7, wherein said support surface is integrally joined to said webs, said webs being defined by cutouts in wall portions at the periphery of said support surface.

10. The sensor according to claim 9, wherein said cutouts extend circularly at the periphery of the support surface.

11. The sensor according to claim 1, wherein a plurality of webs acting functionally in parallel are arranged between a support surface of the cap on said ball and the sensor lever.

12. The sensor according to claim 9, wherein said support surface is integrally formed with at least one pair of lugs which extend radially across one of said cutouts.

13. The sensor according to claim 1, wherein stop means are provided for limiting elastic deflection of said sensor lever.

* * * * *